United States Patent [19]

Brupbacher et al.

[11] Patent Number: 4,915,902

[45] Date of Patent: * Apr. 10, 1990

[54] COMPLEX CERAMIC WHISKER FORMATION IN METAL-CERAMIC COMPOSITES

[75] Inventors: John M. Brupbacher, Catonsville; Leontios Christodoulou, Baltimore; Dennis C. Nagle, Ellicott City, all of Md.

[73] Assignee: Martin Marietta Corporation, Bethesda, Md.

[ * ] Notice: The portion of the term of this patent subsequent to Dec. 1, 2004 has been disclaimed.

[21] Appl. No.: 156,682

[22] Filed: Feb. 17, 1988

Related U.S. Application Data

[60] Continuation-in-part of Ser. No. 943,061, Dec. 18, 1986, which is a division of Ser. No. 662,928, Oct. 19, 1984, abandoned.

[51] Int. Cl.$^4$ ................................ C22C 1/09
[52] U.S. Cl. ..................... 420/129; 420/590; 419/45
[58] Field of Search ............... 420/129, 590; 419/45

[56] References Cited

U.S. PATENT DOCUMENTS

| | | | |
|---|---|---|---|
| 2,852,366 | 9/1958 | Jenkins | 75/232 |
| 3,037,857 | 6/1962 | Conant | 75/244 |
| 3,194,656 | 7/1965 | Vordahl | 420/590 |
| 3,415,697 | 12/1968 | Bredzs et al. | 149/108.2 |
| 3,547,673 | 12/1970 | Bredzs et al. | 427/376.2 |
| 3,666,436 | 5/1972 | Bredzs et al. | 75/0.5 BC |
| 3,672,849 | 6/1972 | Bredzs et al. | 75/244 |
| 3,690,849 | 9/1972 | Bredzs et al. | 75/244 |
| 3,690,875 | 9/1972 | Bredzs et al. | 419/12 |
| 3,705,791 | 12/1972 | Bredzs | 428/565 |
| 3,726,643 | 4/1973 | Merzhanov et al. | 423/409 |
| 3,779,714 | 12/1973 | Nadkarni et al. | 75/951 |
| 3,785,807 | 1/1974 | Backervd | 75/68 R |
| 3,801,308 | 4/1974 | Gustison | 420/129 |
| 3,885,959 | 5/1975 | Badea et al. | 148/437 |
| 4,007,062 | 2/1977 | Sifferlen | 148/437 |
| 4,161,512 | 7/1979 | Merzhanov et al. | 423/440 |
| 4,431,448 | 2/1984 | Merzhanov et al. | 75/238 |
| 4,444,603 | 4/1984 | Yamatsuta et al. | 148/127 |
| 4,478,791 | 10/1984 | Huang et al. | 420/590 |
| 4,514,268 | 4/1985 | De Angelis | 204/67 |
| 4,540,546 | 9/1985 | Giessen | 420/590 |
| 4,613,368 | 9/1986 | Chang et al. | 420/590 |
| 4,623,402 | 11/1986 | Maximov et al. | 148/20.3 |
| 4,642,218 | 2/1987 | Rice | 419/11 |
| 4,710,348 | 12/1987 | Brupbacher et al. | 420/590 |
| 4,748,001 | 5/1988 | Banerji et al. | 420/552 |
| 4,751,048 | 6/1988 | Christodoulou et al. | 420/590 |
| 4,772,452 | 9/1988 | Brupbacher et al. | 420/590 |
| 4,774,052 | 9/1988 | Nagle et al. | 420/590 |

FOREIGN PATENT DOCUMENTS 0113249 7/1984 European Pat. Off. .

OTHER PUBLICATIONS

Maksimov et al, "Mechanism of Product Structure Formation in Processing of Self-Propagating High--Temperature Synthesis", translated from DAN SSSR, vol. 276, No. 4, pp. 891–894, Jun. 1984; Plenum Publishing Corp., 1984.

Maksimov et al, "High Temperature Synthesis of the Ti-B-Fe System", translated from IZVESTIYA Akademii Nauk SSSR, Metally, No. 2, pp. 218–223, 1985, Allarton Press, 1985.

Hardt, "Dense Refractories without Compaction", Research & Development Division, Lockheed Missiles & Space Co.; paper given at symposium, Oct. 21–23, 1985, Daytona Beach, Florida.

Hardt et al, "Propagation of Gasless Reactions in Solids-I. Analytical Study of Exothermic Intermetallic Reaction Rates", Lockheed Palo Alto Research Lab, Palo Alto, California, *Combustion & Flame*, 1973.

Hardt et al, "Propagation of Gasless Reactions in Solids-II. Experimental Study of Exothermic Intermetallic Reaction Rates", Lockheed Palo Alto Research Lab, Palo Alto, California, *Combustion & Flame*, 1973.

Sheppard, Assoc. Ed., "Powders that 'Explode' into Materials", *Advanced Materials & Processes*, Feb. 1986.

Henshaw et al, "Memorandum Report ARBRL-M-R-03354, Self-Propagating High-Temperature Synthesis of Ceramics in Vacuum", U.S. Army Armament Research & Development Center, Aberdeen, Maryland, Apr. 1984.

*Primary Examiner*—L. Dewayne Rutledge
*Assistant Examiner*—George Wyszomierski
*Attorney, Agent, or Firm*—Herbert W. Mylius; Gay Chin

[57] ABSTRACT

The present invention relates to the formation of whisker reinforced metal matrix composites in which complex boride or carbide whiskers are distributed throughout a metal, metal alloy, or intermetallic matrix. Exemplary complex boride whiskers include TiNbB, TiTaB, TiVB, NbHfB, and TiNbMoB. Exemplary complex carbide whiskers include TiNbC, TiVC, TiZrC, TiHfC, and TiTaC. A method for the in-situ formation of complex boride and complex carbide whiskers within metallic matrices is disclosed which involves reacting a mixture of individual complex ceramic-forming constituents in the presence of a metal to precipitate the desired complex ceramic whiskers in a metal matrix.

68 Claims, No Drawings

COMPLEX CERAMIC WHISKER FORMATION IN METAL-CERAMIC COMPOSITES

CROSS REFERENCE TO RELATED APPLICATIONS

This application is a Continuation-In-Part of U.S. patent application Ser. No. 943,061, filed Dec. 18, 1986, which in turn is a Divisional of U.S. patent application Ser. No. 662,928, filed Oct. 19, 1984, now abandoned.

FIELD OF THE INVENTION

The present invention relates to metal-ceramic composites comprising whisker-like ceramic particles distributed throughout a metallic matrix. More particularly, the invention relates to the in-situ formation of complex ceramic whiskers within metal, metal alloy and intermetallic matrices, wherein the complex ceramic comprises a carbide or boride of at least two metals selected from the group consisting of Ti, Zr, Hf, V, Nb, Ta, Cr, Mo and W. The present invention also teaches a method for the direct synthesis of complex ceramic whiskers in a metal, metal alloy, or intermetallic matrix.

BACKGROUND OF THE INVENTION

Ceramic whisker reinforced metal matrix composites offer many unique properties that make them attractive for structural use. Among these are high compressive strength, high fracture toughness and excellent creep characteristics.

Conventional practices for producing whisker reinforced metal-ceramic composites (metal matrix composites or cermets) involve blending of metal powders with separately produced whisker materials. Subsequently, the blend is de-gassed, compacted and hot pressed into a dense final state. The whisker materials are typically composed of silicon carbide (SiC), graphite, or refractory metal fibers. Examples of SiC whisker growth are demonstrated by Arco Silag, LANL vapor-liquid-solid (SiC), Nippon Carbon's Nicalon, and Sumitomo's SiC. Methods of graphite whisker growth are demonstrated by M. Endo's graphite whisker. Methods of refractory metal whisker production are demonstrated by Schladitz, U.S. Pat. No. 3,770,492.

Several difficulties are encountered in the production of conventional whisker reinforced composites. Externally produced whiskers are inevitably exposed to a certain amount of surface contamination during the whisker formation process and/or during subsequent handling steps. The surface contaminants, such as oxides, result in a deleterious layer or coating at the whisker-to-metal interface in the composite. Such layers inhibit interfacial bonding between the whiskers and the metal matrix, adversely effecting ductility of the composite. The weakened interfacial contact may also result in reduced strength, loss of elongation, and facilitated crack propagation. Additionally, the presence of surface contamination may inhibit wetting of the whiskers by molten matrix metal, rendering preparation of the composite difficult if not impossible. Consequently, many conventional whisker reinforced composites are not capable of being remelted, due to the tendency of the non-wetted whiskers to segregate from the molten matrix metal. Further, externally produced whiskers tend to agglomerate during powder blending steps, resulting in a non-uniform distribution of whiskers throughout the metal matrix. Also, at moderately high operating temperatures, conventional whiskers often deteriorate and/or react with the matrix metal. Another disadvantage is that refractory whisker materials have limited commercial availability, with associated high costs. In addition, handling of conventional whiskers in the 0.05 to 3.0 micron size range may potentially present hazards due to the pyrophoric nature as well as health hazards associated with the inhalation of very fine particles.

Molten metal infiltration of a continuous skeleton of second phase material has also been used to produce whisker reinforced composites. In this technique, preformed whisker material, such as silicon carbide, is pressed to form a compact, and liquid metal, such as aluminum, is forced into the packed bed to fill the intersticies. In the production of SiC/Al by this method, elaborate particle coating techniques have been developed to protect the SiC whiskers from the molten aluminum during infiltration and to improve bonding between the SiC and aluminum. Such a technique is illustrated in U.S. Pat. No. 4,444,603 to Yamatsuta et al, hereby incorporated by reference. In addition to the disadvantages associated with externally produced whiskers noted above, molten metal infiltration techniques further necessitate molten metal handling and the use of high pressure equipment.

The present invention overcomes the disadvantages of the prior art noted above. More particularly, the present invention provides for a cleaner whisker/metal interface compared with conventional whisker reinforced composites made by techniques using preformed whiskers because the reinforcing whiskers are formed in-situ. The clean whisker/metal interface achievable by the present invention results in highly improved mechanical properties. For example, the whisker reinforced composites of the present invention may exhibit fiber pullout under fracture, resulting in increased fracture toughness. A further advantage is that the whisker materials of the present invention exhibit excellent stability in metals at high temperatures, i.e. in excess of 1800° C. Additionally, the complex ceramic whisker reinforced composites of the present invention can be produced at costs well below those of current whisker technologies, using simplified procedures and equipment compared to the prior art.

The production of metal matrix/ceramic composites using a solvent assisted in-situ precipitation technique is described in U.S. Pat. No. 4,710,348, issued Dec. 1, 1987 to Brupbacher et al, hereby incorporated by reference, and in the following U.S. patents: U.S. Pat. Nos. 4,774,052, issued Sept. 27, 1988, to Nagle et al; 4,751,048, issued June 14, 1988, to Christodoulou et al; and 4,772,452, issued Sept. 20, 1988, to Brupbacher et al; each of which is hereby incorporated by reference. These disclosures are primarily directed to the formation of metal matrix composites comprising particles of binary ceramic materials, such as $TiB_2$, $ZrB_2$ and TiC, dispersed throughout metallic matrices. These in-situ precipitated ceramic particles are typically of equiaxed shape, as opposed to the whisker shaped particles of the present invention. The formation of complex ceramic particulates is taught as is the preparation of particulates of varying morphology.

With these facts in mind, a detailed description of the invention follows which achieves advantages over known methods of producing whisker reinforced composites.

SUMMARY OF THE INVENTION

It is an object of the present invention to provide whisker reinforced metal matrix composite materials comprisng in-situ precipitated complex ceramic whiskers distributed throughout metal matrices. The complex ceramic whiskers may be composed of either borides or carbides of at least two of the following metals: Ti, Zr, Hf, V, Nb, Ta, Cr, Mo and W. Complex borides include TiNbB, TiTaB, TiHfB, TiVB, NbHfB and TiNbMoB. Complex carbides include TiNbC, TiVC, TiZrC, TiHfC and TiTaC. The metal matrices may comprise metals, metal alloys or intermetallics.

It is a further object of the present invention to provide a method for the in-situ formation of complex boride and carbide whiskers within metal matrices involving the direct synthesis of complex boride and carbide whiskers from each of the individual constituents of the complex boride and carbide whiskers to be formed.

The advantages of the present invention will become more readily understood by consideration of the following description and examples.

DESCRIPTION OF THE PREFERRED EMBODIMENTS

The present invention is directed to whisker reinforced metal matrix composites wherein the whiskers are composed of complex borides or carbides which are formed in-situ within a matrix metal. The metal matrix may comprise a metal, metal alloy or intermetallic. In accordance with the present invention, a method is taught for preparing composite materials containing complex boride and carbide whiskers.

Elements which are suitable for the formation of complex borides and carbides include Ti, Zr, Hf, V, Nb, Ta, Cr, Mo and W. Accordingly, the complex borides and carbides of the present invention are composed of at least two of the preceding elements in combination with either boron or carbon. Preferred complex borides include TiNbB, TiTaB, TiHfB, TiVB, NbHfB and TiNbMoB. Preferred complex carbides include TiVC, TiNbC, TiZrC, TiHfC, and TiTaC. It is noted that the nomenclature used to define the various complex ceramics of the present invention is intended to describe the elements present in the material, but is not intended to describe the stoichiometric proportions of the elements. For example, the nomenclature TiNbB is meant to define a complex ceramic material composed of the elements Ti, Nb and B. However, a wide range of stoichiometric proportions of Ti, Nb and B may be possible.

Suitable matrix metals include aluminum, titanium, nickel, copper, cobalt, iron, niobium, tantalum, boron, zinc, molybdenum, yttrium, hafnium, tin, tungsten, lithium, beryllium, silver, platinum, gold, magnesium, bismuth, antimony, thorium, silicon, chromium, vanadium, zirconium, manganese, scandium, lanthanum, rare earth elements, and alloys or intermetallics thereof. Preferred matrix metals include aluminum and aluminum alloys. In addition, preferred intermetallic matrix materials include aluminides, such as titanium, nickel and niobium aluminides.

In general, the complex ceramic whiskers may range in diameter from less than 1 micron to 5 microns and in length from 5 to 200 microns. More preferably, the complex ceramic whiskers range in diameter from 1 to 3 microns and in length from 5 to 50 microns.

The length to diameter, or aspect ratio of the whiskers may range from 10 : 1 to 100 : 1. More preferably, the aspect ratios range from 20 : 1 to 100 : 1. The average aspect ratio for whiskers of the present invention is approximately 50 : 1. However, a wide range of aspect ratios may be obtained depending upon, for example, the particular whisker/matrix compositions chosen.

According to the present invention, a wide range of whisker loadings is possible, depending upon the intended use of the composite material. Whisker loadings of from less than 5 to greater than 90 volume percent are achieveable. For structural applications, whisker loadings of 5 to 30 volume percent may be used. For applications such as armor plating, whisker loadings of 60 to 90 volume percent would be desireable.

The method of formation of the complex ceramics of the present invention involves a direct synthesis process in which complex boride or carbide whiskers are directly formed in one step by reacting the individual constituents of the whisker material to be formed. In the direct synthesis process, individual constituents of the complex ceramic material to be formed are provided, along with a solvent metal, in a starting mixture which is subsequently reacted. A composite material is thereby formed comprising a dispersion of the desired complex boride or carbide whiskers within a solvent metal matrix. The complex ceramic-forming constituents may be provided as individual elements, or alternatively, at least one of the constituents may be provided as an alloy with a solvent metal. Further, at least one of the constituents may be provided in the form of a compound or intermetallic. In this case, one element of the compound is reactive to form the desired complex ceramic, while the remaining element, which may be the same as or different from the solvent metal, acts to form the solvent metal matrix.

In accordance with the direct synthesis process, boron or carbon and at least two of the elements selected from the group of Ti, Zr, Hf, V, Nb, Ta, Cr, Mo and W are separately provided in a reaction mixture. In addition, a solvent metal must be present in the reaction mixture to form the desired metal matrix. During the complex ceramic-forming reaction, the solvent metal may act as a solvent for the individual complex ceramic-forming constituents, but must not act as a solvent for the complex ceramic whiskers to be formed. Additional metal may be present in the reaction mixture, which acts to form an alloy or intermetallic with the solvent metal. The solvent metal matrix of the final composite may therefore comprise the solvent metal individually, or may comprise an alloy or intermetallic of the solvent metal with additional metals. Examples of the direct synthesis of complex boride whiskers in aluminum and titanium aluminide matricies include:

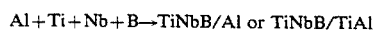

Al+Ti+Nb+B→TiNbB/Al or TiNbB/TiAl

Al+Ti+Hf+B→TiHfB/Al or TiHfB/TiAl

Al+Ti+Ta+B→TiTaB/Al or TiTaB/TiAl

(Al)+TiAl+Nb+B→TiNbB/Al or TiNbB/TiAl

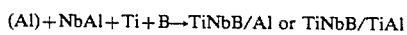

(Al)+NbAl+Ti+B→TiNbB/Al or TiNbB/TiAl (Al)+AlB$_{12}$+Ti+Nb→TiNbB/Al or TiNbB/TiAl

Examples of the direct synthesis of complex carbide whisker in aluminum and titanium aluminide matricies include:

Al+Ti+V+C→TiVC/Al or TiVC/TiAl

Al+Ti+Zr+C→TiZrC/Al or TiZrC/TiAl

Al+Ti+Ta+C→TiTaC/Al or TiTaC/TiAl (Al)+TiAl+V+C→TiVC/Al or TiVC/TiAl (Al)+Al$_4$C$_3$+Ti+V→TiVC/Al or TiVC/TiAl

The complex boride and carbide whisker reinforced composites produced according to the various embodiments listed above are primarily useful as materials which can be fabricated to form a wide range of shaped articles. However, an additional use is in the formation of complex boride and carbide whiskers. In this case, formation is achieved by removing the metal matrix from the complex ceramic whiskers, for example, by dissolving the metal matrix away from the whiskers using an acid solution.

The following examples illustrate the formation of complex boride and carbide whisker reinforced metal matrix composites according to the methods of the present invention.

EXAMPLE 1

Al, Ti, and B powders (−325 mesh) are blended with 5 atomic percent Nb powder (−325 mesh). The mixture is packed in Gooch tubing and isostatically pressed to 40 ksi, forming a compact. The compact is placed on a water cooled cold finger in a quartz tube under flowing argon and is heated in a radio frequency field which initiates a reaction of the compact. Analysis of the resultant composite material reveals a dispersion of TiNbB whiskers within a TiAl45 matrix (titanium aluminide with 45 atomic percent aluminum). The aspect ratio of the whiskers is greater than 20:1.

EXAMPLE 2

An experiment similar to that of Example 1 is performed, with the exception that 2 atomic percent Nb is used in the starting mixture. Upon reaction, no TiNbB needles are formed, indicating that a minimum amount of Nb is required in the starting mixture to form TiNbB whiskers. Further experimentation reveals that a minimum of approximately 4 atomic percent Nb is required in a starting mixture of Al, Ti, B and Nb powders to form TiNbB whiskers within a titanium aluminide matrix.

EXAMPLE 3

Al, Ti, and AlB$_{12}$ powders (−325 mesh) are blended with 5 atomic percent Nb powder (−325 mesh). The mixture is packed in Gooch tubing and isostatically pressed to 40 ksi, forming a compact. The compact is placed on a water cooled cold finger in a quartz tube under flowing argon and is heated in a radio frequency field which initiates a reaction of the compact. Analysis of the resultant composite material reveals a dispersion of TiNbB whiskers within a TiAl45 matrix. The aspect ratio of the whiskers is greater than 20:1.

EXAMPLE 4

Al, Ti, and B powders in stoichiometric proportions ensuring that substantially all of the titanium present acts to form TiNbB (−325 mesh) are blended with 5 atomic percent Nb powder (−325 mesh). The mixture is packed in Gooch tubing and isostatically pressed to 40 ksi, forming a compact. The compact is placed on a water cooled cold finger in a quartz tube under flowing argon and is heated in a radio frequency field which initiates a reaction of the compact. Analysis of the resultant composite material reveals a dispersion of TiNbB whiskers within an aluminum matrix. The aspect ratio of the whiskers is greater than 20:1.

EXAMPLE 5

Al, Ti, and B powders (−b 325 mesh) are blended with 2 atomic percent Ta powder (−325 mesh). The mixture is packed in Gooch tubing and isostatically pressed to 40 ksi, forming a compact. The compact is placed on a water cooled cold finger in a quartz tube under flowing argon and is heated in a radio frequency field which initiates a reaction of the compact. Analysis of the resultant composite material reveals a dispersion of TiTaB whiskers within a TiAl45 matrix. The aspect ratio of the whiskers is greater than 20:1.

EXAMPLE 6

Al, Ti, and B powders (−325 mesh) are blended with 10 atomic percent Hf powder (−325 mesh). The mixture is packed in Gooch tubing and isostatically pressed to 40 ksi, forming a compact. The compact is placed on a water cooled cold finger in a quartz tube under flowing argon and is heated in a radio frequency field which initiates a reaction of the compact. Analysis of the resultant composite material reveals a dispersion of TiHfB whiskers within a TiAl45 matrix. The aspect ratio of the whiskers is greater than 20:1.

EXAMPLE 7

A mixture is formed comprising the following −325 mesh powders: H 62 grams Ti, 89 grams Zr and 47 grams Al$_4$C$_3$. The mixture is ball-milled and then packed in Gooch tubing and isostatically pressed to 40 ksi, forming a compact. The compact is placed on a water cooled cold finger in a quartz tube under flowing argon and is heated in a radio frequency field which initiates a reaction of the compact. Analysis of the resultant composite material reveals a dispersion of TiZrC whiskers within a titanium aluminide containing matrix. The wiskers range in diameter from about 2 to about 3 microns and in length from about 10 to about 50 microns.

EXAMPLE 8

A mixture is formed comprising the following −325 mesh powders: 44 grams Ti, 124 grams Ta and 33 grams Al$_4$C$_3$. The mixture is ball-milled and then packed in Gooch tubing and isostatically pressed to 40 ksi, forming a compact. The compact is placed on a water cooled cold finger in a quartz tube under flowing argon and is heated in a radio frequency field which initiates a reaction of the compact. Analysis of the resultant composite material reveals a dispersion of TiTaC whiskers within a titanium aluminide containing matrix. The wiskers range in diameter from about 0.5 to about 1.5 microns and in length from about 5 to about 15 microns.

EXAMPLE 9

Al, Ti, and C powders (−325 mesh) are blended with 5 atomic percent V powder (−325 mesh). The mixture is packed in gooch tubing and isostatically pressed to 40 ksi, forming a compact. The compact is placed on a water cooled cold finger in a quartz tube under flowing argon and is heated in a radio frequency field which initiates a reaction of the compact. Analysis of the resultant composite material reveals a dispersion of TiVC whiskers within a TiAl45 matrix. The aspect ratio of the wiskers is greater than 20:1.

In the direct synthesis process, various techniques may be used to initiate the complex ceramic-forming reaction. Each of these techniques involves the preparation of a mixture of the individual constituents of the complex ceramic to be formed, along with at least one solvent metal which acts to form the metal matrix. The mixture is then reacted by the techniques described below to form a dispersion of complex ceramic whiskers within a metallic matrix. In each of the following embodiments, the complex ceramic-forming constituents may be provided in elemental form, or at least one of the constituents may be provided in the form of an alloy, compound or intermetallic of a matrix-forming metal. For example, in the formation of TiNbB complex boride whiskers in an aluminum containing matrix, the titanium constituent may initially be provided as an elemental powder, or as an alloy or intermetallic of aluminum. Likewise, the boron constituent may initially be provided in the form of elemental powder, or as a compound of aluminum, such as $AlB_{12}$.

In one embodiment, the complex ceramic-forming reaction is initiated by bulk heating a mixture comprising complex ceramic-forming constituents and at least one solvent metal. In accordance with the bulk heating process, the starting mixture is preferably compressed to form a compact which is then heated in, for example, a furnace to initiate the complex ceramic-forming reaction. The reaction typically occurs at a temperature approximating the melting temperature of the solvent metal. Bulk heating may also be achieved by plasma spray techniques in which the starting mixture is introduced into a plasma flame. The starting mixture may be in the form of elemental or mechanically alloyed powders. U.S. Pat. No. 4,710,348 to Brupbacher et al, listed above, gives a detailed description of bulk heating techniques as applied to the formation of composites primarily comprising binary ceramic particles. The bulk heating process disclosed therein may be adapted in order to provide a method for initiation of the complex ceramic-forming reaction of the present invention.

In an alternative embodiment, porous composites comprising complex ceramic whiskers dispersed in a solvent metal matrix are formed using a local ignition process. In this process a mixture comprising complex ceramic-forming constituents and at least one solvent metal is compressed to form a green compact, followed by local ignition to initiate a substantially isothermal wave front which moves along the compact. The propagating reaction results in the in-situ precipitation of substantially insoluble complex ceramic whiskers in a solvent metal matrix. The substantially isothermal wave front, which promotes uniformity of whisker size, results from the high thermal conductivity of the solvent metal, in combination with concentrations of the solvent metal sufficient to achieve a substantially isothermal character across the material to be reacted. The porosity of the resultant composite preferably exceeds about 10 percent, and more preferably exceeds about 25 percent. U.S. patent application Ser. No. 927,014, filed Nov. 5, 1986, gives a detailed description of local ignition techniques as applied to the formation of composites primarily comprising binary ceramic particles. The local ignition process disclosed therein may be adapted in order to provide a method for initiation of the complex ceramic-forming reaction of the present invention.

In each of the bulk heating and local ignition embodiments, the complex ceramic whisker reinforced metal matrix composites produced are typically porous. If a dense final material is desired, it may be advantageous to perform further densification steps. For example, pressure may be applied to the reaction mass during, or just subsequent to, the complex ceramic-forming reaction. Heat given off during the reaction is thereby utilized to aid in densification of the composite. In addition, methods incorporating high pressures and temperatures, such as hot isostatic pressing, may be used after the reaction mass has cooled to eliminate porosity. Alternatively, porous composites comprising relatively low ceramic loadings may be remelted to form dense ingots.

Complex ceramic whisker reinforced metal matrix composites of relatively high ceramic loadings, which are produced by either the bulk heating or local ignition process, are particularly suitable for use as master concentrates in the formation of whisker reinforced composites having lower ceramic loadings. This technique, known as the sponge dilution process, involves introducing a high loading whisker reinforced composite of the present invention into an additional amount of metal, metal alloy or intermetallic to produce a lower loading composite comprising a dispersion of the complex ceramic whiskers within a final metal matrix. The additional metal may either be the same as, or different from, the matrix metal of the high loading composite. Multiple dilution steps are also possible. U.S. Pat. No. 4,751,048, listed above, gives a detailed description of sponge dilution techniques as applied to the formation of composites primarily comprising binary ceramic particles. The complex ceramic whisker reinforced metal matrix composites of the present invention may be further diluted, utilizing the previously disclosed sponge dilution process, to form relatively low loading complex ceramic whisker reinforced metal matrix composites.

Another alternative embodiment of the direct synthesis method relates to the formation of complex ceramic whisker reinforced composites by a direct addition process. In this approach, a mixture comprising complex ceramic-forming constituents and at least one solvent metal is added to a molten matrix metal, resulting in the in-situ formation of complex ceramic whiskers within a final metal matrix. The molten matrix metal may be the same as, or different than the solvent metal. The complex ceramic-forming constituents may be added as a preform or compact of the starting mixture. It is to be noted that a solvent metal must be present in the preform or compact to facilitate the reaction of the complex ceramic-forming constituents. The complex ceramic whisker reinforced metal matrix composites produced by the direct addition process are typically in the form of dense, final materials which may be processed using conventional metal forming operations, such as extrusion, forging and rolling, to form final products. U.S. patent application Ser. No. 927,031, filed Nov. 5, 1986, gives a detailed description of direct addition techniques as applied to the formation of composites primarily comprising binary ceramic particles. The direct addition process disclosed therein may be adapted in order to provide a method for initiation of the complex ceramic reaction of the present invention.

An additional embodiment, which may be used in conjunction with any of the bulk heating, local ignition and direct addition processes discussed above, relates to the preparation of complex ceramic reinforced composites having intermetallic matrices. This process is preferably directed to the formation of reinforced aluminides, such as titanium, nickel and niobium aluminides. Methods of preparation involve providing a starting mixture comprising complex ceramic-forming constituents and intermetallic matrix-forming metals in the proper stoichiometric proportions to form the desired complex ceramic whiskers in an intermetallic containing matrix. The complex ceramic-forming reaction may be initiated by any of the bulk heating, local ignition and direct addition processes. U.S. Pat. No. 4,774,052, listed above, gives a detailed description of intermetallic matrix forming techniques as applied to the formation of composites primarily comprising binary ceramic particles. The intermetallic matrix formation processes disclosed therein may be adapted in order to provide a method for the formation of the complex ceramic whisker reinforced intermetallics of the present invention.

It is noted that the present invention has a number of advantages over whisker reinforced metal matrix composites produced by conventional techniques. For example, this invention involves the formation of complex boride and carbide whiskers having compositions which have not previously been obtained in the prior art. The present invention circumvents the need for preformed whisker materials, and therefore avoids difficulties, such as surface contamination, agglomeration and whisker deterioration, typically encountered with conventional whisker reinforced composites. Further, the whisker reinforced composites of the present invention have improved high temperature stability, in that the complex boride and carbide whiskers are not reactive with the metal matrix. As opposed to whisker reinforced composites presently available, the composites of the present invention can be remelted and recast while retaining fine grain size, uniform whisker dispersion, and the resultant superior physical properties of the material. Further still, the present complex boride and carbide whisker reinforced composites may be fabricated in substantially conventional fashion, by casting, forging, extruding, rolling, machining, etc. In addition, the present composites can be welded without degradation of material properties. Also, relatively high whisker loading composites of the present invention are highly suitable for admixture with additional metal to achieve lower whisker loading composites having superior hardness and modulus qualities over currently employed composites, such as SiC/aluminum.

It is understood that the above description of the present invention is susceptible to considerable modification, change, and adaptation by those skilled in the art, and such modifications, changes and adaptations are intended to be considered to be within the scope of the present invention, which is set forth by the appended claims.

We claim:

1. A method for the formation of complex boride whisker reinforced metal matrix composites, the method comprising precipitating whiskers of at least one complex boride material in a solvent metal matrix by contacting reactive complex boride-forming constituents and a solvent--,.metal at a temperature at which sufficient diffusion of at least one of the complex boride-forming constituents into the solvent metal occurs to cause a reaction of the complex boride-forming constituents to thereby precipitate complex boride whiskers in the solvent metal matrix, said complex boride comprising boron and at least two of the elements selected from the group consisting of Ti, Zr, Hf, V, Nb, Ta, Cr, Mo and W.

2. The method of claim 1, wherein the complex boride-forming constituents are provided in the form of elemental powders.

3. The method of claim 1, wherein at least one of the complex boride-forming constituents is provided as an alloy of the solvent metal.

4. The method of claim-,1 wherein at least one of the complex boride-forming constituents is provided as an intermetallic of the solvent metal.

5. The method of claim 1, wherein at least one of the complex boride-forming constituents is provided as a compound of the solvent metal.

6. The method of claim 1, wherein the complex boride whiskers are TiNbB, TiTaB, TiHfB, TiVB, NbHfB, TiNbMoB, or a combination thereof.

7. The method of claim 1, wherein the solvent metal matrix comprises a metal, metal alloy or intermetallic.

8. The method of claim 7, wherein the solvent metal matrix comprises aluminum, or an alloy thereof.

9. The method of claim 7, wherein the solvent metal matrix comprises an aluminide of titanium, nickel or niobium.

10. The method of claim 1, wherein the complex boride whiskers comprise from about 5 volume percent to about 80 volume percent of the metal matrix composite.

11. The method of claim 1, wherein the complex boride whiskers range in diameter from about 1 micron to about 5 microns.

12. The method of claim 11, wherein the complex boride whiskers range in length from about 5 microns to about 200 microns.

13. The method of claim 1, wherein the complex boride whiskers range in diameter from about 1 micron to about 3 microns.

14. The method of claim 13, wherein the complex boride whiskers range in length from about 5 microns to about 50 microns.

15. A method for the formation of complex carbide whisker reinforced metal matrix composites, the method comprising precipitating whiskers of at least one complex carbide material in a solvent metal matrix by contacting reactive complex carbide-forming constituents and a solvent metal at a temperature at which sufficient diffusion of at least one of the complex carbide-forming constituents into the solvent metal occurs to cause a reaction of the complex carbide-forming constituents to thereby precipitate complex carbide whiskers in the solvent metal matrix, said complex carbide comprising carbon and at least two of the elements selected from the group consisting of Ti, Zr, Hf, V, Nb, Ta, Cr, Mo and W.

16. The method of claim 15, wherein the complex carbide-forming constituents are provided in the form of elemental powders.

17. The method of claim 15, wherein at least one of the complex carbide-forming constituents is provided as an alloy of the solvent metal.

18. The method of claim 15, wherein at least one of the complex carbide-forming constituents is provided as an intermetallic of the solvent metal.

19. The method of claim 15, wherein at least one of the complex carbide-forming constituents is provided as a compound of the solvent metal.

20. The method of claim 15, wherein the complex carbide whiskers are TiNbC, TiVC, TiZrC, TiHfC, TiTaC, or a combination thereof.

21. The method of claim 15, wherein the solvent metal matrix comprises a metal, metal alloy or intermetallic.

22. The method of claim 21, wherein the solvent metal matrix comprises aluminum, or an alloy thereof.

23. The method of claim 21, wherein the solvent metal matrix comprises an aluminide of titanium, nickel or niobium.

24. The method of claim 15, wherein the complex carbide whiskers comprise from about 5 volume percent to about 80 volume percent of the metal matrix composite.

25. The method of claim 15, wherein the complex carbide whiskers range in diameter from about 1 micron to about 5 microns.

26. The method of claim 25, wherein the complex carbide whiskers range in length from about 5 microns to about 200 microns.

27. The method of claim 15, wherein the complex carbide whiskers range in diameter from about 1 micron to about 3 microns.

28. The method of claim 27, wherein the complex carbide whiskers range in length from about 5 microns to about 50 microns.

29. A method for the formation of complex boride whiskers within a solvent metal matrix, wherein the complex boride comprises boron and at least, two of the elements selected from the group consisting of Ti, Zr, Hf, V, Nb, Ta, Cr, Mo and W, the method comprising:
   (a) preparing a mixture comprising powders of reactive complex boride-forming constituents and a solvent metal in which at least one of the complex boride-forming constituents is more soluble than the complex boride phase;
   (b) heating the mixture to a reaction initiation temperature approximating the melting point of the solvent metal to initiate an exothermic reaction;
   (c) permitting the exothermic reaction to further heat the mixture and to form a distribution of complex boride whiskers within the solvent metal matrix; and
   (d) recovering a product.

30. The method of claim 29, wherein the mixture is compressed to form a compact prior to the heating thereof.

31. The method of claim 30, wherein heating is achieved by bulk heating the compact.

32. The method of claim 30, wherein heating is achieved by igniting a substantially localized portion of the compact.

33. The method of claim 29, wherein heating is achieved by introducing the mixture into a plasma flame.

34. The method of claim 33, wherein the mixture is mechanically alloyed prior to introduction into the plasma flame.

35. The method of claim 29, wherein the complex boride-forming constituents are provided in elemental form.

36. The method of claim 29, wherein at least one of the complex boride-forming constituents is provided as an alloy of the solvent metal.

37. The method of claim 29, wherein at least one of the complex boride-forming constituents is provided as an intermetallic of the solvent metal.

38. The method of claim 29, wherein at least one of the complex boride-forming constituents is provided as a compound with the solvent metal.

39. The method of claim 29, wherein the complex boride whiskers are TiNbB, TiTaB, TiHfB, TiVB, NbHfB, TiNbMoB, or a combination thereof.

40. The method of claim 29, wherein the solvent metal matrix comprises a metal, metal alloy or intermetallic.

41. The method of claim 40, wherein the solvent metal matrix comprises aluminum, or an alloy thereof.

42. The method of claim 40, wherein the solvent metal matrix comprises an aluminide of titanium, nickel or niobium.

43. The method of claim 29, wherein the complex boride whiskers comprise from about 5 volume percent to about 80 volume percent of the product.

44. The method of claim 29, wherein the complex boride whiskers range in diameter from about 1 micron to about 5 microns.

45. The method of claim 44, wherein the complex boride whiskers range in length from about 5 microns to about 200 microns.

46. The method of claim 29, wherein the complex boride whiskers range in diameter from about 1 micron to about 3 microns.

47. The method of claim 46, wherein the complex boride whiskers range in length from about 5 microns to about 50 microns.

48. A method for the formation of complex carbide whiskers within solvent metal matrix, wherein the complex carbide comprises carbon and at least too of the elements selected from the group consisting of Ti, Zr, Hf, V, Nb, Ta, Cr, Mo and W, the method comprising:
   (a) preparing a mixture comprising powders of reactive complex carbide-forming constituents and a solvent metal in which at least one of the complex carbide-forming constituents is more soluble than the complex carbide phase;
   (b) heating the mixture to a reaction initiation temperature approximating the melting point of the solvent metal to initiate an exothermic reaction;
   (c) permitting the exothermic reaction to further heat the mixture and to form a distribution of complex carbide whiskers within the solvent metal matrix; and
   (d) recovering a product.

49. The method of claim 48, wherein he mixture is compressed to form a compact prior to the heating thereof.

50. The method of claim 49, wherein heating is achieved by bulk heating the compact.

51. The method of claim 49, wherein heating is achieved by igniting a substantially localized portion of the compact.

52. The method of claim 48, wherein heating is achieved by introducing the mixture into a plasma flame.

53. The method of claim 52, wherein the mixture is mechanically alloyed prior to introduction into the plasma flame.

54. The method of claim 48, wherein the complex carbide-forming constituents are provided in elemental form.

55. The method of claim 48, wherein at least one of the complex carbide-forming constituents is provided as an alloy of the solvent metal.

56. The method of claim 48, wherein at least one of the complex carbide-forming constituents is provided as an intermetallic of the solvent metal.

57. The method of claim 48, wherein at least one of the complex carbide-forming constituents is provided as a compound with the solvent metal.

58. The method of claim 48, wherein the complex carbide whiskers are TiNbC, TiVC, TiZrC, TiHfC, TiTaC, or a combination thereof.

59. The method of claim 48, wherein the solvent metal matrix comprises a metal, metal alloy or intermetallic.

60. The method of claim 59, wherein the solvent metal matrix comprises aluminum, or an alloy thereof.

61. The method of claim 59, wherein the solvent metal matrix comprises an aluminide of titanium, nickel or niobium.

62. The method of claim 48, wherein the complex carbide whiskers comprise from about 5 volume percent to about 80 volume percent of the product.

63. The method of claim 48, wherein the complex carbide whiskers range in diameter from about 1 micron to about 5 microns.

64. The method of claim 63, wherein the complex carbide whiskers range in length from about 5 microns to about 200 microns.

65. The method of claim 48, wherein the complex carbide whiskers range in diameter from about 1 micron to about 3 microns.

66. The method of claim 65, wherein the complex carbide whiskers range in length from about 5 microns to about 50 microns.

67. A method for the formation of complex boride whiskers within a final metal matrix, wherein the complex boride comprises boron and at least two of the elements selected from the group consisting of Ti, Zr, Hf, V, Nb, Ta, Cr, Mo and W, the method comprising:
    (a) preparing a mixture comprising powders of reactive complex boride-forming constituents and a solvent metal in which at least one of the complex boride-forming constituents is more soluble than the complex boride phase;
    (b) adding the mixture to a molten matrix metal, metal alloy or intermetallic at a temperature at which sufficient diffusion of at least one of the complex boride-forming constituents into the solvent metal occur to initiate an exothermic reaction;
    (c) permitting the exothermic reaction to further heat the mixture and to form a distribution of complex boride whiskers within the final metal matrix; and
    (d) recovering a product.

68. A method for the formation of complex carbide whiskers within a final metal matrix, wherein the complex carbide comprises carbon and at least two of the elements selected from the group consisting of Ti, Zr, Hf, V, Nb, Ta, Cr, Mo and W, the method comprising:
    (a) preparing a mixture comprising powders of reactive complex carbide-forming constituents and a solvent metal in which at least one of the complex carbide-forming constituents is more soluble than the complex carbide phase;
    (b) adding the mixture to a molten matrix metal, metal alloy or intermetallic at a temperature at which sufficient diffusion of at least one of the complex carbide-forming constituents into the solvent metal occurs to initiate an exothermic reaction;
    (c) permitting the exothermic reaction to further heat the mixture and to form a distribution of complex carbide whiskers within the final metal matrix; and
    (d) recovering a product.

* * * * *